(12) United States Patent
Kamiyoshihara

(10) Patent No.: US 10,311,612 B2
(45) Date of Patent: Jun. 4, 2019

(54) DISPLAY DEVICE AND METHOD OF CONTROLLING SAME

(71) Applicant: CANON KABUSHIKI KAISHA, Tokyo (JP)

(72) Inventor: Masahiro Kamiyoshihara, Kamakura (JP)

(73) Assignee: Canon Kabushiki Kaisha, Tokyo (JP)

(*) Notice: Subject to any disclaimer, the term of this patent is extended or adjusted under 35 U.S.C. 154(b) by 82 days.

(21) Appl. No.: 15/217,437

(22) Filed: Jul. 22, 2016

(65) Prior Publication Data

US 2017/0032556 A1 Feb. 2, 2017

(30) Foreign Application Priority Data

Jul. 28, 2015 (JP) ................................ 2015-148690

(51) Int. Cl.
*G06F 3/14* (2006.01)
*G06T 11/60* (2006.01)
(Continued)

(52) U.S. Cl.
CPC ............ *G06T 11/60* (2013.01); *G09G 3/3611* (2013.01); *G09G 2300/023* (2013.01);
(Continued)

(58) Field of Classification Search
CPC .............. G06T 11/60; G09G 2300/023; G09G 2320/028; G09G 2320/068; G09G 2358/00; G09G 2380/08; G09G 3/3611
See application file for complete search history.

(56) References Cited

U.S. PATENT DOCUMENTS 7,747,086 B1* 6/2010 Hobbs ..................... G06T 9/004
382/232
2008/0088649 A1* 4/2008 Ikeno ................... G09G 3/3611
345/690
(Continued)

FOREIGN PATENT DOCUMENTS

JP 2008-122940 A 5/2008
JP 2010-014989 A 1/2010
(Continued)

OTHER PUBLICATIONS

Fritz Albregtsen, "Reflection, refraction, diffraction, and scattering", 2008, section 2.2.1, p. 2-13 to 2-14. http://www.uio.no/studier/emner/matnat/ifi/INF-GEO4310/h11/undervisningsmateriale/imaging-kap2.pdf.*

(Continued)

*Primary Examiner* — Sing-Wai Wu
(74) *Attorney, Agent, or Firm* — Cowan, Liebowitz & Latman, P.C.

(57) ABSTRACT

Provided is a display device including a first display unit, a second display unit arranged on a back side of the first display unit, a generation unit configured to perform predetermined image processing on first image data to generate second image data, and a control unit configured to select one of a plurality of display modes including a first display mode on which the first display unit displays an image based on the first image data and the second display unit displays an image based on the second image data, and a second display mode on which the first display unit and the second display unit display the image based on the first image data.

13 Claims, 16 Drawing Sheets

(51) Int. Cl.
*G06T 7/00* (2017.01)
*G09G 3/3208* (2016.01)
*G09G 3/36* (2006.01)

(52) U.S. Cl.
CPC . *G09G 2320/028* (2013.01); *G09G 2320/068* (2013.01); *G09G 2358/00* (2013.01); *G09G 2380/08* (2013.01)

(56) References Cited

U.S. PATENT DOCUMENTS

2010/0289819 A1* 11/2010 Singh .................... G09G 3/003
  345/619
2011/0007089 A1* 1/2011 Bell ....................... G09G 3/003
  345/593
2013/0300985 A1* 11/2013 Bulda ................... G02F 1/1323
  349/86
2014/0253848 A1* 9/2014 Wammes ............ G02F 1/13363
  349/96

FOREIGN PATENT DOCUMENTS

JP      2013-130841 A    7/2013
JP      2014-126774 A    7/2014

OTHER PUBLICATIONS

The above foreign patent documents were cited in the Mar. 5, 2019 Japanese Office Action, which is enclosed without an English Translation, that issued in Japanese Patent Application No. 2015-148690.

\* cited by examiner

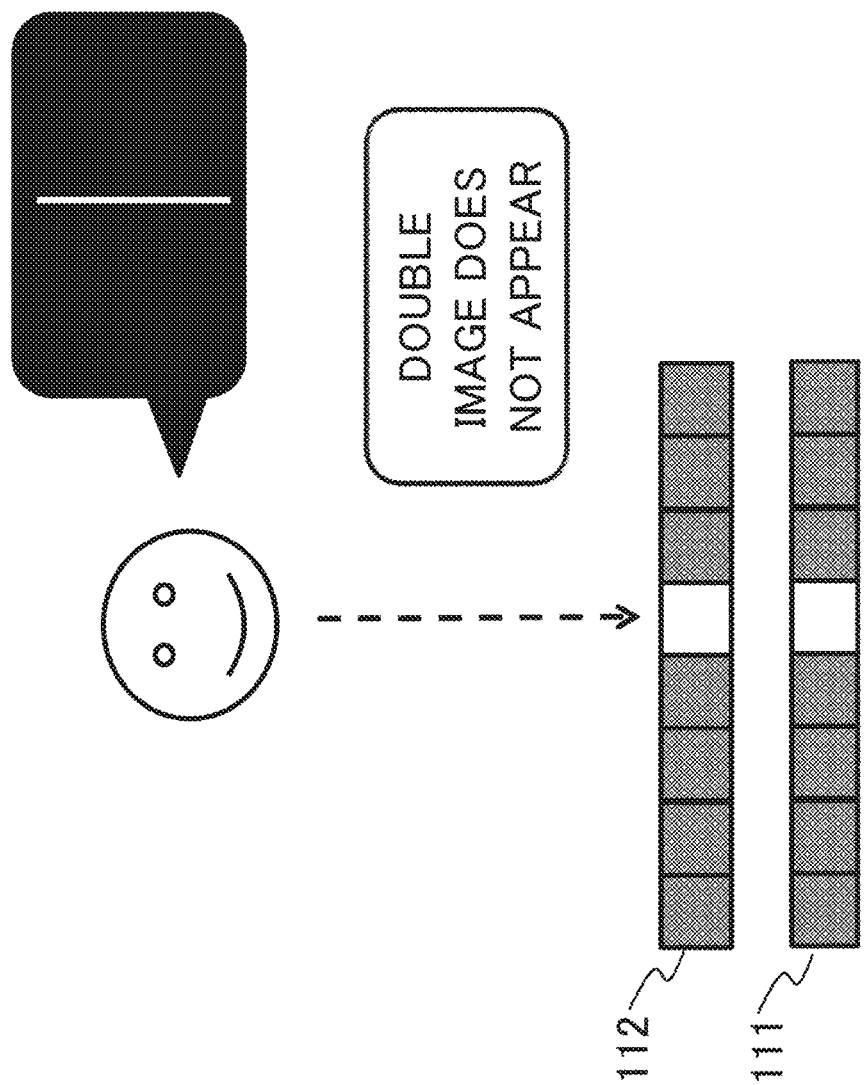

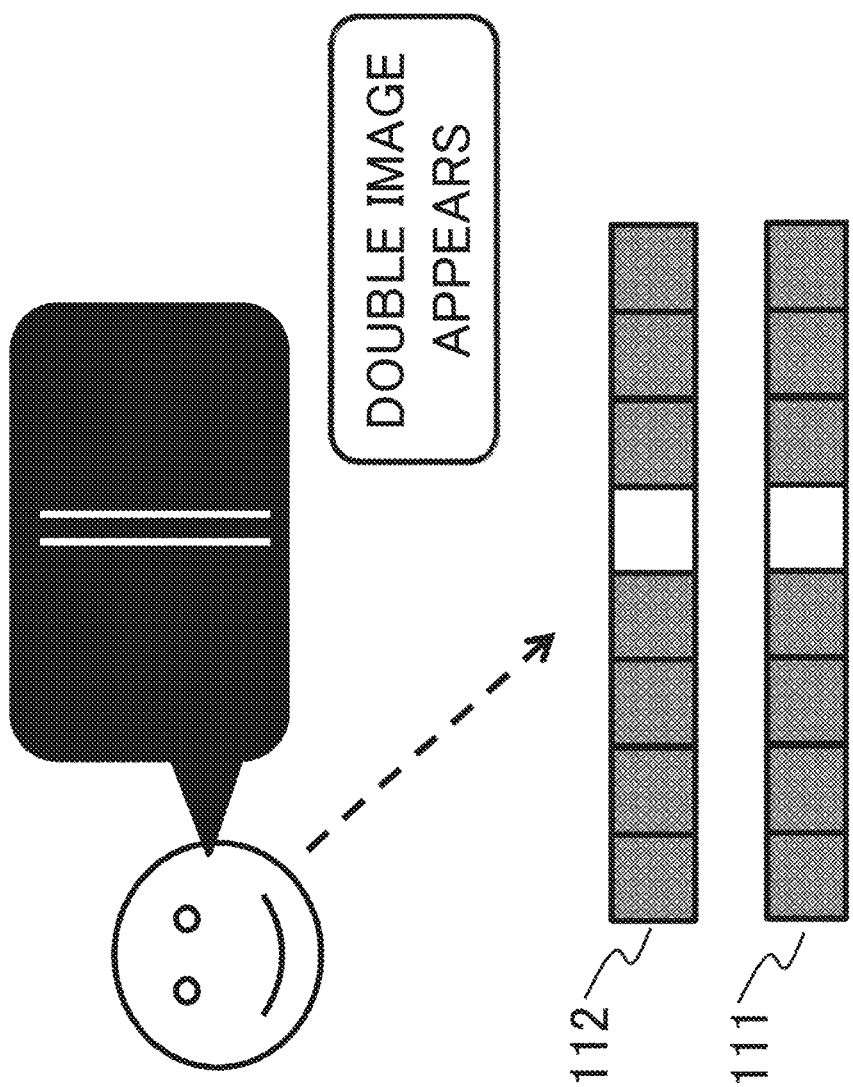

DISPLAY DEVICE AND METHOD OF CONTROLLING SAME

BACKGROUND OF THE INVENTION

Field of the Invention

The present invention relates to a display device and a method of controlling the same.

Description of the Related Art

One scheme for achieving high-contrast display in liquid crystal display devices is the dual-layer LCD technology. The dual-layer LCD technology considerably improves the contrast by superimposing two liquid crystal panels, relative to a structure using one liquid crystal panel.

In the dual-layer LCD technology, space is often provided between the liquid crystal panels upon arranging liquid crystals into two layers, in order to prevent scratches or the like caused by contact of the liquid crystal panels. Even without the space being provided between the liquid crystal panels, space due to the thickness of the liquid crystal panel itself exists. With the influence of the space, there are cases where images displayed in same positions on the two liquid crystal panels appear to be in differing positions, depending on the angle (direction) of observation in which a user views the images. This phenomenon is particularly significant with high-frequency images of a string of characters, numbers, or the like in which a difference in tone is distinct. This poses a problem of low visibility due to the characters or numbers appearing as a double image.

As a method of solving the problem, technology is disclosed in which a light-transmitting area of an LCD on the backlight side contains a display area for input image signals so that a decrease in visibility is prevented regardless of the direction of observation. Related art of the present invention is described, for example, in Japanese Patent Application Laid-open No. 2010-14989 and Japanese Patent Application Laid-open No. 2013-130841.

SUMMARY OF THE INVENTION

With the dual-layer LCD technology, as described above, there are cases where a phenomenon of a double image occurs depending on the angle of observation. However, there are images less likely to decrease in visibility (less likely to appear as a double image), even with a dual-layer LCD. For example, with images such as a natural image or a diagnostic mammogram in which changes in tone are smooth, the phenomenon of a double image is less likely to occur even when displaying is made the same in first and second liquid crystal panels, without using the technology disclosed in the related art described above. Applying the related art described above to displaying of such an image can prevent the phenomenon of a double image. However, it may happen that displaying is at a lower resolution and with a less distinct brightness (luminance) difference, a halo appears when viewed from the front, or the effect of improving the in-plane contrast, which is an advantage of a dual-layer LCD, is decreased.

The present invention achieves both high display image quality and favorable visibility by performing optimum display control in accordance with an image to be displayed in a display device including a dual-layer LCD.

A first aspect of the present invention is a display device including a first display unit, a second display unit arranged on a back side of the first display unit, a generation unit configured to perform predetermined image processing on first image data to generate second image data, and a control unit configured to select one of a plurality of display modes including a first display mode on which the first display unit display an image based on the first image data and the second display unit displays an image based on the second image data, and a second display mode on which the first display unit and the second display unit display the image based on the first image data.

A second aspect of the present invention is a method of controlling a display device including a first display unit and a second display unit arranged on a back side of the first display unit, the method including performing predetermined image processing on first image data to generate second image data and selecting one of a plurality of display modes including a first display mode on which the first display displays an image based on the first image data and the second display unit displays an image based on the second image data, and a second display mode on which the first display unit and the second display unit display the image based on the first image data.

A third aspect of the present invention is a recording medium storing a program to cause a computer to execute each step of a method of controlling a display device including a first display unit and a second display unit arranged on a back side of the first display unit, the method including performing predetermined image processing on first image data to generate second image data and selecting one of a plurality of display modes including a first display mode on which the first display unit displays an image based on the first image data and the second display unit displays an image based on the second image data, and a second display mode on which the first display unit and the second display unit display the image based on the first image data.

With the present invention, high display image quality and favorable visibility can both be achieved by performing optimum display control in accordance with an image to be displayed in a display device including a dual-layer LCD.

Further features of the present invention will become apparent from the following description of exemplary embodiments with reference to the attached drawings.

BRIEF DESCRIPTION OF THE DRAWINGS

FIG. 7 is a schematic representation of a case where the example of the pattern image is displayed in the wide viewing angle mode;

FIG. 8 is a schematic representation of a case where the example of the pattern image is displayed in a narrow viewing angle mode;

DESCRIPTION OF THE EMBODIMENTS

Embodiment 1

A display device of Embodiment 1 of the present invention will be described.

Figure 1:
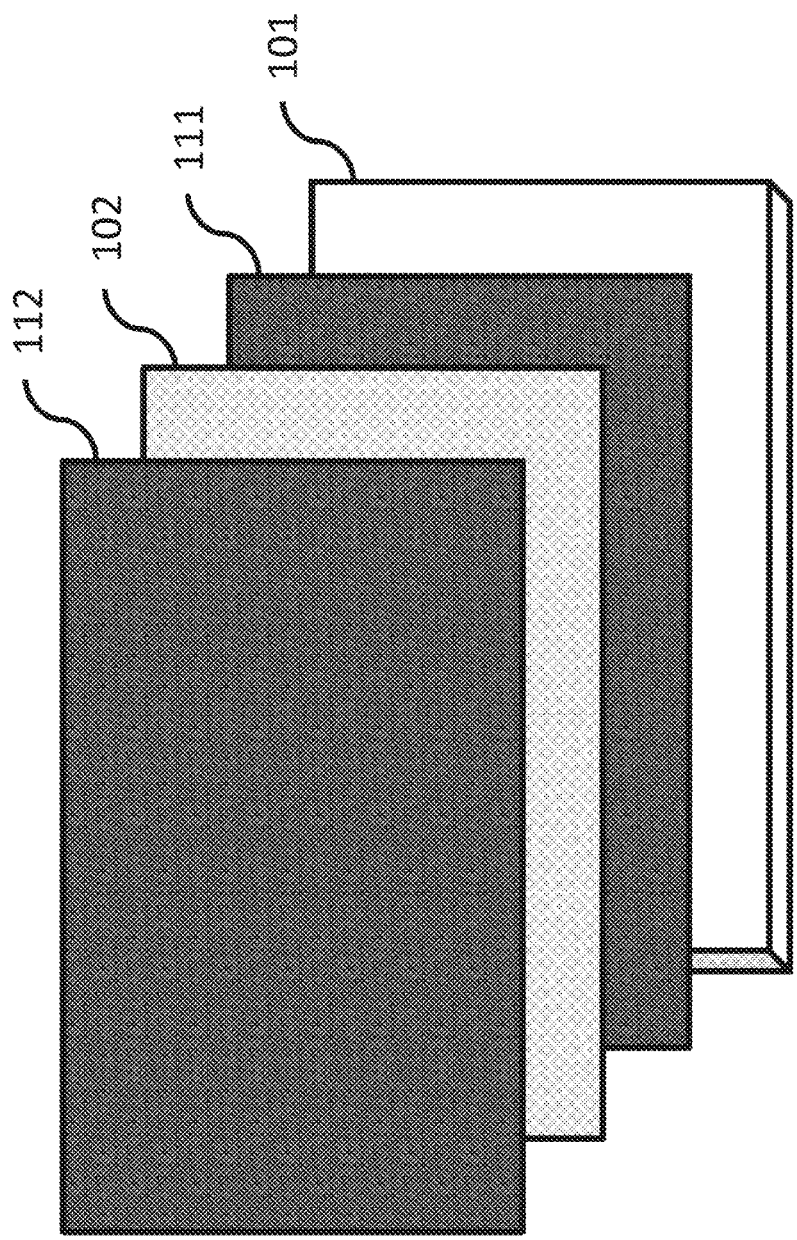
FIG. 1 is a schematic representation showing an example of the configuration of a display device in Embodiments 1 to 3.

FIG. 1 is a block diagram showing the configuration of the display device in Embodiment 1.

The display device includes, as a first display unit, a first liquid crystal panel 112 on the front side and, as a second display unit, a backlight 101 and a second liquid crystal panel 111 arranged on the backlight side to modulate light from the backlight 101. The second liquid crystal panel 111 is visible through the first liquid crystal panel 112. In order to prevent moiré, in the case of providing two layers of the liquid crystal panels, the second liquid crystal panel 111 is provided on the back side of, and with a certain interval from, the first liquid crystal panel 112, or the second liquid crystal panel 111 is provided on the back side of the first liquid crystal panel 112 with an optical sheet such as a diffusion sheet 102 therebetween. In Embodiment 1, the configuration is such that the diffusion sheet 102 is provided between the liquid crystal panels, preferably without an interval between the liquid crystal panels.

There are various schemes for the display mode of a liquid crystal panel, such as in-plane switching (IPS), vertical alignment (VA), and twisted nematic (TN). The present invention is applicable to a display device including a liquid crystal panel of any scheme. In Embodiment 1, it is assumed that the second liquid crystal panel 111 and the first liquid crystal panel 112 are IPS liquid crystal panels.

Figure 2:
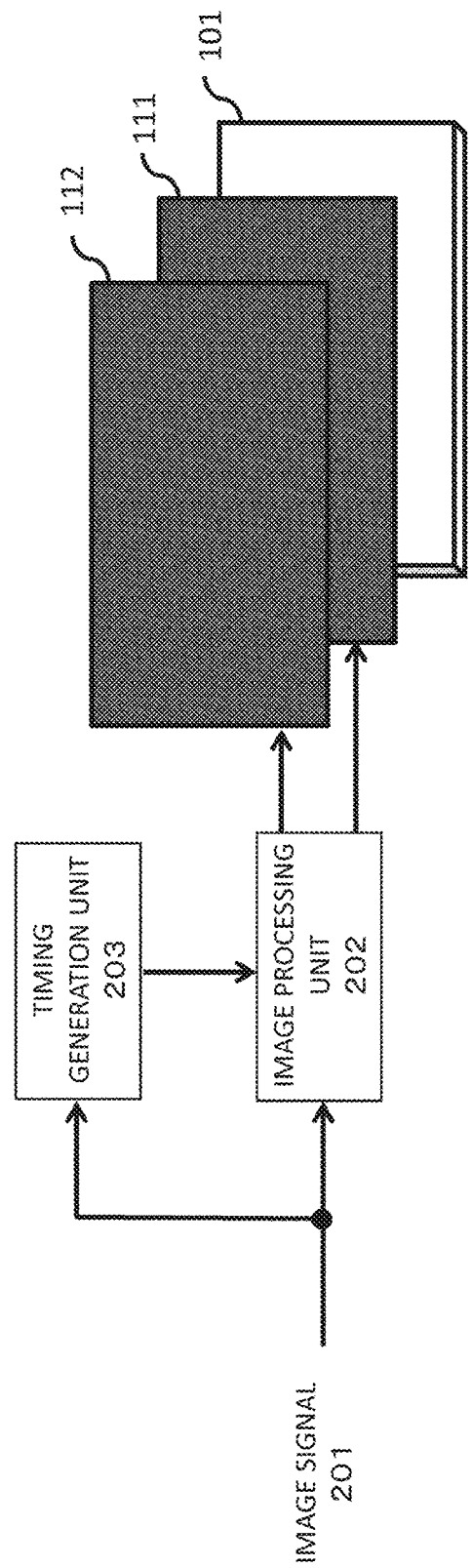
FIG. 2 is a block diagram showing an example of the main configuration in Embodiment 1.

FIG. 2 is a diagram showing the functional configuration of the display device in Embodiment 1.

In FIG. 2, an image processing unit 202 performs predetermined image processing in accordance with content of a received image signal 201 (first image data) to generate second image data. In accordance with the content of the first image data, the image processing unit 202 outputs the first image data or the second image data to each of the second liquid crystal panel 111 and the first liquid crystal panel 112.

A timing generation unit 203 controls the timing of outputting the image data to the second liquid crystal panel 111 and the first liquid crystal panel 112 to synchronize image display in the two liquid crystal panels.

Figure 3:
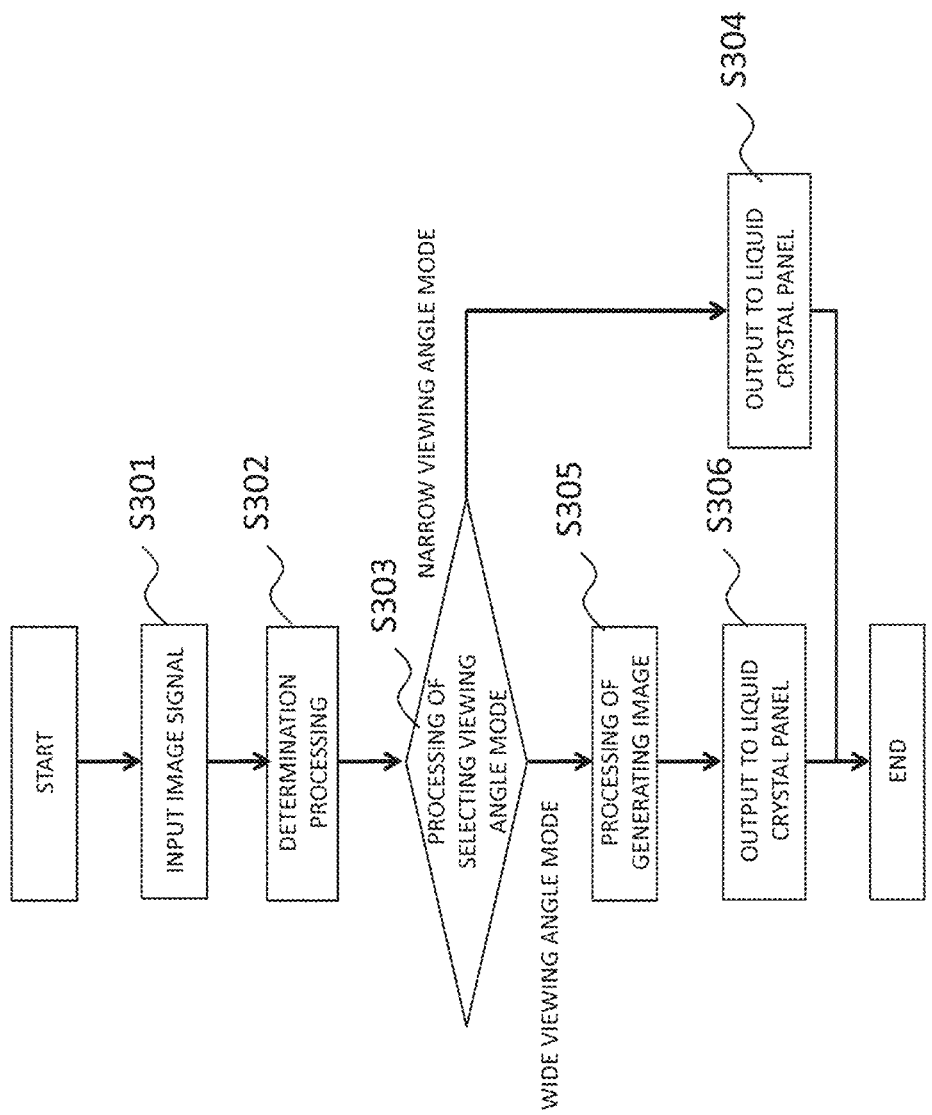
FIG. 3 is a flowchart showing processing in Embodiment 1.

FIG. 3 is a flowchart representing processing in Embodiment 1.

In step S301, an image signal (first image data) is input.

In step S302, the image processing unit 202 performs determination processing. In the determination processing, the image processing unit 202 determines which one of a wide viewing angle mode and a narrow viewing angle mode an image of the first image data is suited for.

The narrow viewing angle mode is a display mode in which same images (images based on the first image data) are displayed in the second liquid crystal panel 111 and the first liquid crystal panel 112, so that high-contrast display is obtained. In the narrow viewing angle mode, the image based on the first image data is displayed in both the first liquid crystal panel 112 and the second liquid crystal panel 111.

The wide viewing angle mode is a display mode in which an image for the wide viewing angle mode (second image data) is generated and displayed in the second liquid crystal panel 111, so that a double image is less likely to be observed regardless of the direction of observation. In the wide viewing angle mode, the image based on the first image data is displayed in the first liquid crystal panel 112, and the image based on the second image data is displayed in the second liquid crystal panel 111. The second image data is image data to be displayed in the second liquid crystal panel 111 in order to prevent a double image caused by pixels in same positions on the first liquid crystal panel 112 and on the second liquid crystal panel 111 being visually recognized in differing positions due to parallax occurring in accordance with the direction of observation by an observer.

For example, an image with a relatively great change in brightness (change in tone) within the image, such as an image formed of a string of characters (text) or a graphic pattern, is more likely to appear as a double image when the direction of observation is oblique. However, the contrast does not have much influence on the display quality perceived by an observer. That is, an observer is less likely to perceive the display quality as being low, even without displaying at high contrast. Therefore, the necessity of displaying at high contrast is relatively low. The image processing unit 202 determines such an image as being suited for the wide viewing angle mode.

On the other hand, with a film or a natural image (photographed image) of a scenery or the like, a change in brightness (change in tone) within the image is relatively small and smooth. Therefore, a double image is less likely to appear (visual recognition that there are two layers is less likely), even when the direction of observation is oblique. However, the contrast has a great influence on the display quality perceived by an observer. That is, when the contrast is low, the display quality is more likely perceived as being low. The image processing unit 202 determines such an image as being suited for the narrow viewing angle mode.

In Embodiment 1, the image processing unit 202 performs determination on the content of the image of the first image data through an image analysis. For example, the image processing unit 202 scans the image for each pixel to determine whether or not a change in tone of the pixels is a steep change as in a rectangular waveform. Based on the determination result, determination is made between an image suited for the wide viewing angle mode and an image suited for the narrow viewing angle mode. For example, the image processing unit 202 obtains and compares, with a predetermined threshold value, a feature amount showing the magnitude of the change in tone (change in brightness) within the image. In the case where the magnitude of the change in brightness is greater than the threshold value, the image is determined as being suited for the wide viewing angle mode. In the case where the magnitude of the change in brightness is less than or equal to the threshold value, the image is determined as being suited for the narrow viewing angle mode. For a method of determining the type of image, other methods may be used without being limited to the above.

In step S303, the image processing unit 202 performs processing of selecting the wide viewing angle mode or the narrow viewing angle mode as the display mode, based on the determination result in step S302. In the case of the narrow viewing angle mode, it proceeds to step S304. In the case of the wide viewing angle mode, it proceeds to step S305.

In step S304, the image processing unit 202 outputs same images to the second liquid crystal panel 111 and the first liquid crystal panel 112.

In step S305, the image processing unit 202 generates an image for displaying in the second liquid crystal panel 111. In this processing, the image processing unit 202 displays a rougher image (image with lower resolution) than an original input image.

A method of generating an image to be displayed in the second liquid crystal panel 111 in the wide viewing angle mode will be described using FIGS. 4 and 5.

Figure 4:
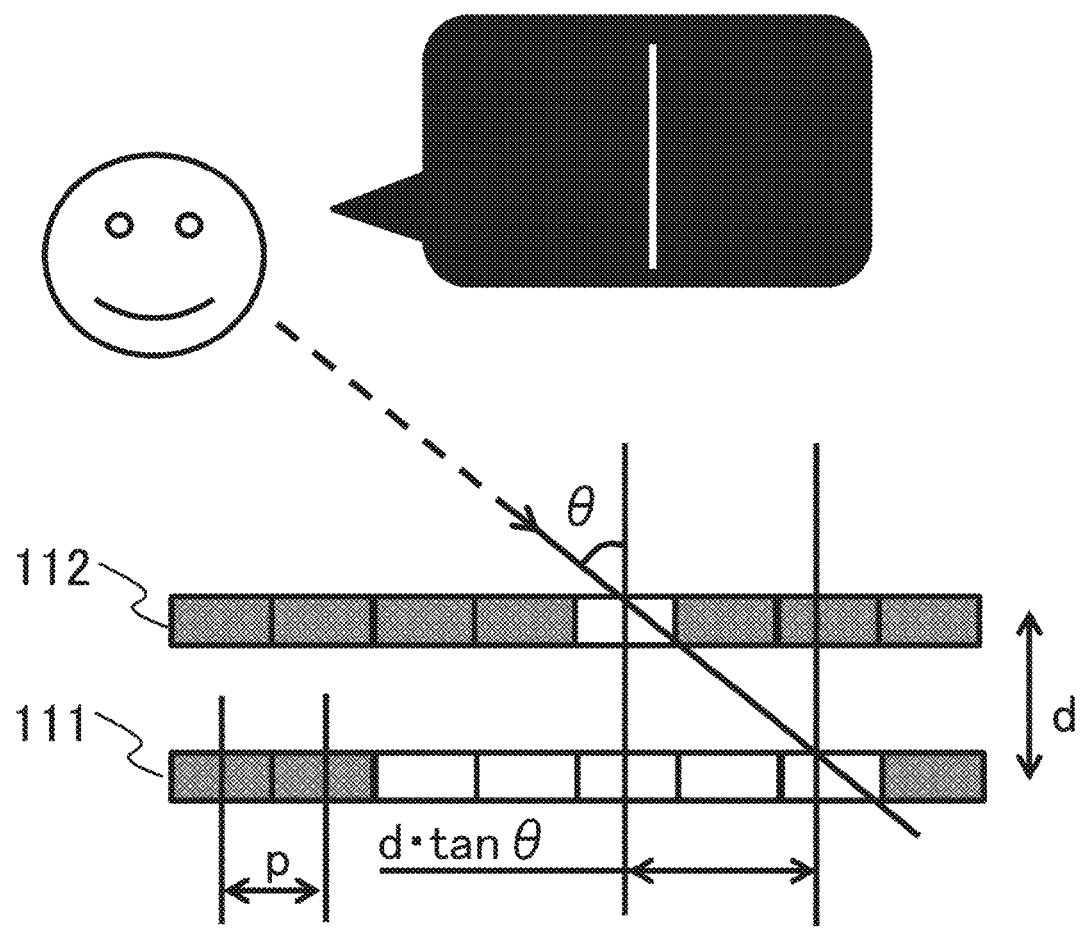
FIG. 4 is a first schematic representation showing an example of a wide viewing angle mode.

In FIG. 4, θ is the angle of observation (angle of viewing direction) representing the direction in which an observer observes a screen, d is the distance between the liquid crystal panels, and p is the pixel pitch. In order to prevent a double image upon an oblique observation, the wide viewing angle mode displays, in the second liquid crystal panel 111, an image generated by enlarging an area corresponding to each pixel in an original image (image displayed in the first liquid crystal panel 112) to the periphery by x pixels. With the following expression, x can be determined.

[Formula 1]

$$(x-1)\cdot p \leq d \cdot \tan \theta \leq x \cdot p \quad \text{(Expression 1)}$$

Figure 5:
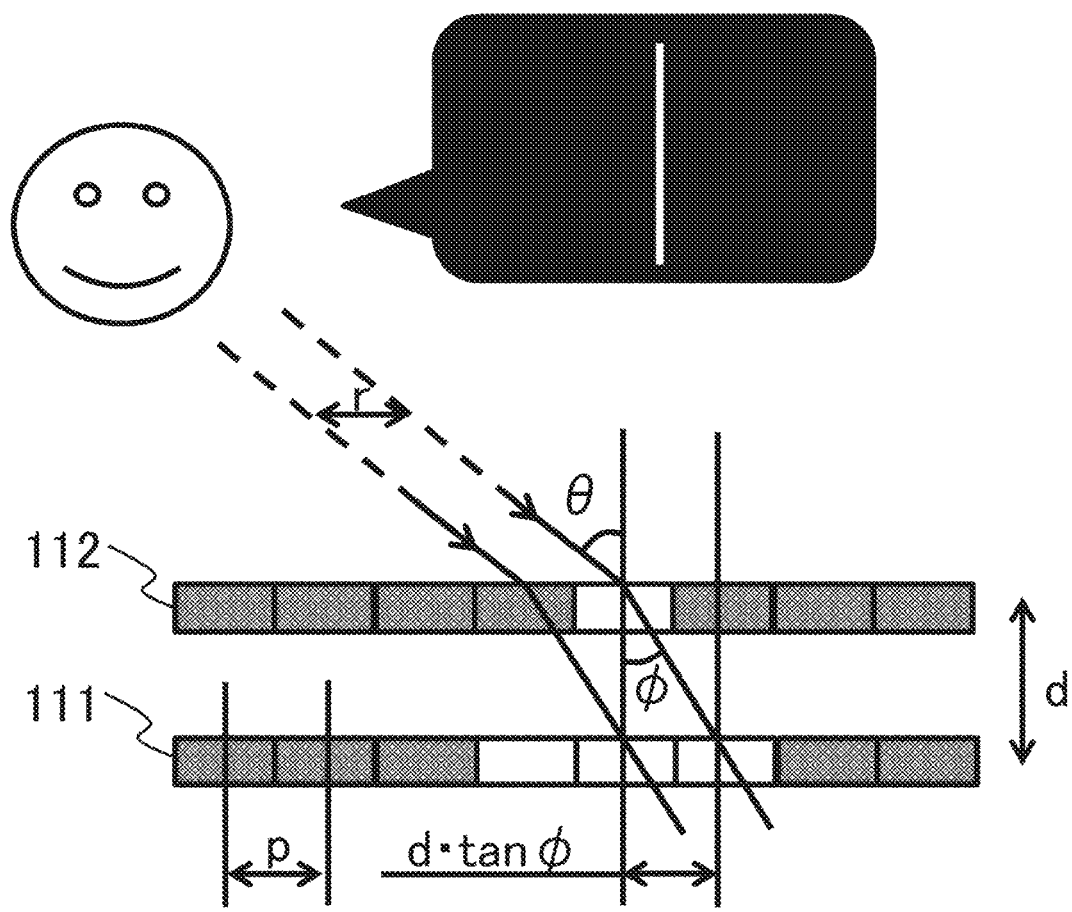
FIG. 5 is a second schematic representation showing an example of the wide viewing angle mode.

FIG. 5 illustrates a case where the refractive index is taken into consideration. According to Snell's law, the following expression holds for the angle of observation θ, where φ is the angle of a light ray traveling between the second liquid crystal panel 111 and the first liquid crystal panel 112 in relation to the first liquid crystal panel 112, Na is the refractive index of air, and Np is the refractive index of the liquid crystal panel.

[Formula 2]

$$Na \cdot \sin \theta = Np \cdot \sin \phi$$

$$\phi = \sin^{-1}((Na/Np)\cdot \sin \theta) \quad \text{(Expression 2)}$$

From this relationship, the amount of displacement r of display positions between the second liquid crystal panel 111 and the first liquid crystal panel 112 when viewed in the angle of observation θ can be represented by the following expression.

[Formula 3]

$$\tan \phi = r/d$$

$$r = d \cdot \tan \phi \quad \text{(Expression 3)}$$

Thus, in order to prevent a double image, it suffices to display, in the second liquid crystal panel 111, the image generated by enlarging an area corresponding to each pixel in the original image to the periphery by x pixels determined with the following formula.

[Formula 4]

$$(x-1)\cdot p \leq d \cdot \tan \phi \leq x \cdot p \quad \text{(Expression 4)}$$

Note that, in the example in which the refractive index is taken into consideration, the amount of reduction in the resolution of the image displayed in the second liquid crystal panel 111 is small. Therefore, there are cases where a double image cannot be prevented sufficiently. For example, in the case where a subtle position displacement has occurred between the two liquid crystal panels, a double image may appear.

The method described above of generating an image to be displayed in the second liquid crystal panel 111 when the wide viewing angle mode is selected is an example and not limiting. For example, in the case where a diffusion sheet is arranged between the liquid crystal panels, an image to be displayed in the second liquid crystal panel 111 in the wide viewing angle mode is generated in accordance with the degree of diffusion.

Figure 6:
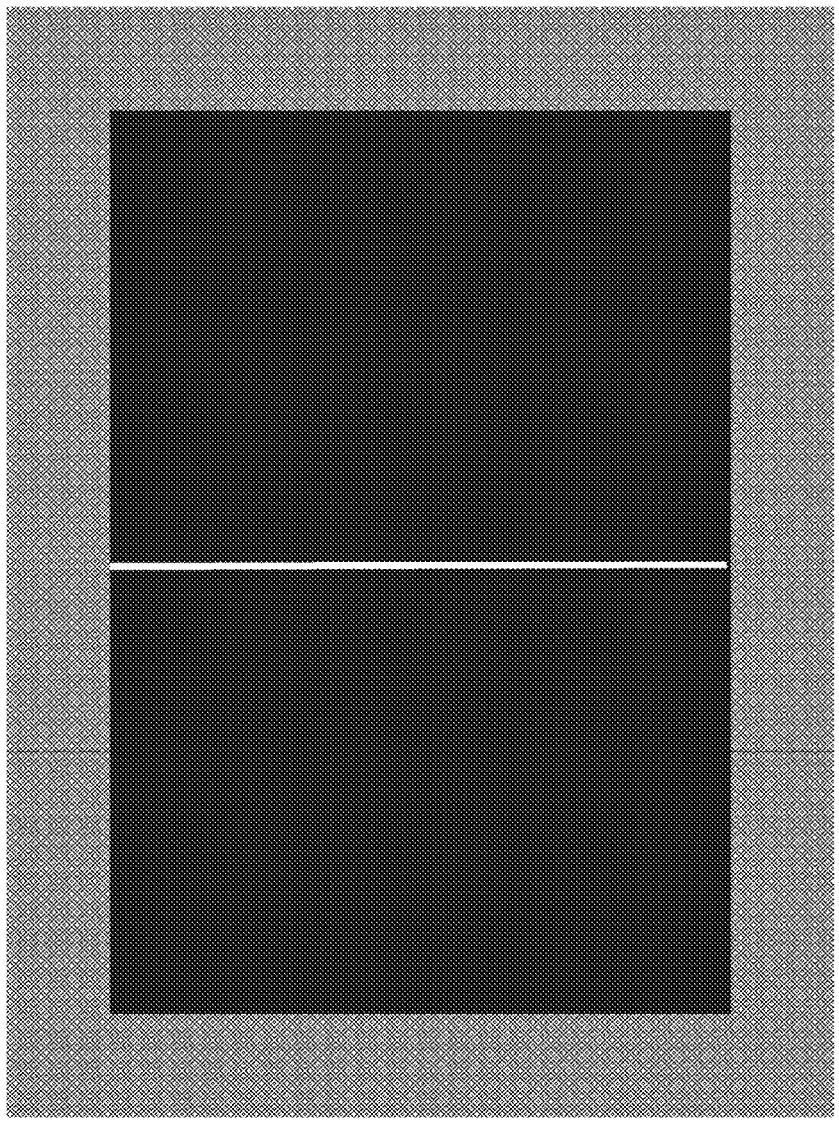
FIG. 6 is an example of a pattern image.

Next, the appearance of an image in each of the narrow viewing angle mode and the wide viewing angle mode will be described. Herein, the appearance of a case where an image, as shown in FIG. 6, with one vertical white line on a black background is displayed will be described as an example. Such a pattern image is likely to appear as a double image when the direction of observation is oblique, and is suited for the wide viewing angle mode.

In the case where the pattern image is displayed in the narrow viewing angle mode, display is superimposed when viewed from the front, and it appears that there is one line as in FIG. 7. However, when the image is viewed obliquely, and it appears that there are two lines as in FIG. 8. On the other hand, in the case where displaying is in the wide viewing angle mode, a double image is prevented even in oblique view, and it appears that there is one line being displayed as in FIG. 7.

In the case where the image displayed in the wide viewing angle mode is viewed from the front, there is a possibility that a halo is visually recognized as a brightened periphery of the image. However, compared to a halo observed in the case of performing local dimming of a backlight in a general display device, the degree of the halo is small, and the influence on the quality of the visually recognized image is small. Thus, a decrease in contrast within the screen can be prevented even upon displaying in the wide viewing angle mode. Thus, a pattern image of a character, a graphical user interface (GUI), or the like is preferably displayed in the wide viewing angle mode.

Figure 9B:
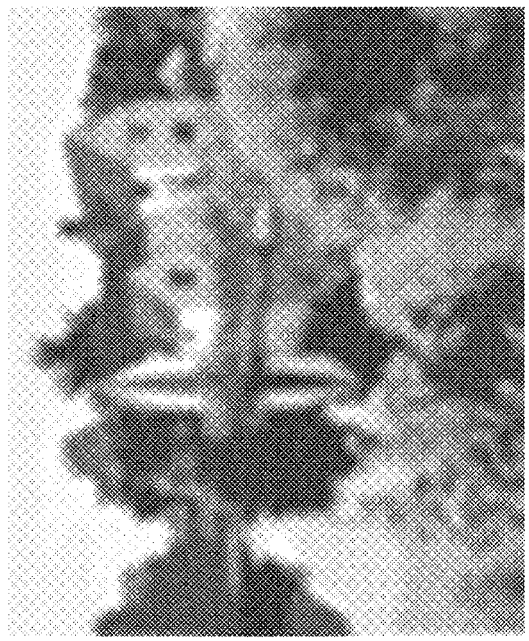
FIGS. 9A and 9B are schematic representations of an example of a natural image and a case of displaying in the wide viewing angle mode.
Figure 9A:
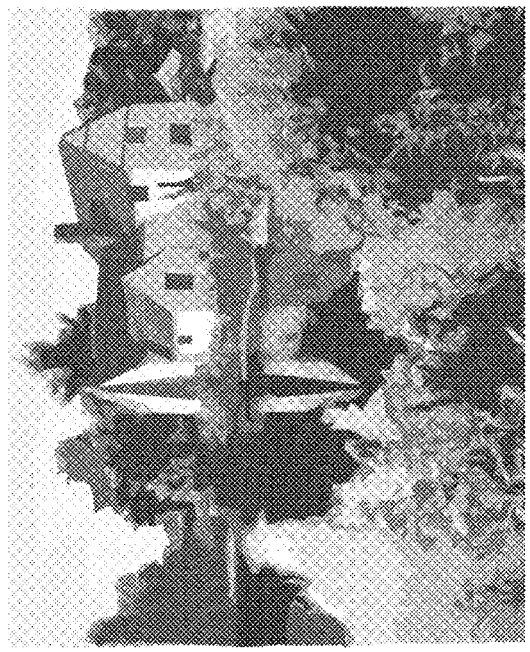

The appearance of a case where a natural image, as shown in FIG. 9A, is displayed in the wide viewing angle mode is schematically shown in FIG. 9B. When the natural image is displayed in the wide viewing angle mode, an image with reduced resolution with respect to the original image (FIG. 9A) is generated and displayed in the second liquid crystal panel 111. Therefore, there is a possibility of the appearance being blurry, as in FIG. 9B. Since the generated image in which an area corresponding to each pixel is enlarged to the periphery is displayed in the second liquid crystal panel 111, the overall transmittance increases. Therefore, the effect of improving contrast, which is an advantage of a dual-layer LCD, is limited. In the case of a natural image, visual recognition that there are two layers is less likely, even when displaying in the narrow viewing angle mode is observed obliquely. Displaying in the narrow viewing angle mode can prevent a decrease in the effect of improving contrast. Thus, a natural image as in FIG. 9A is preferably displayed in the narrow viewing angle mode.

In Embodiment 1 described above, the display mode is selected in accordance with whether an image is that more likely to appear as a double image, as with a pattern image of FIG. 6, or that less likely to appear as a double image, as with the natural image of FIG. 9A. A double image can be prevented by displaying, in the wide viewing angle mode, an image more likely to appear as a double image, and a decrease in the effect of improving contrast with a dual-layer LCD can be prevented by displaying, in the narrow viewing angle mode, an image less likely to appear as a double image.

Embodiment 2

A display device of Embodiment 2 will be described.

Figure 10:
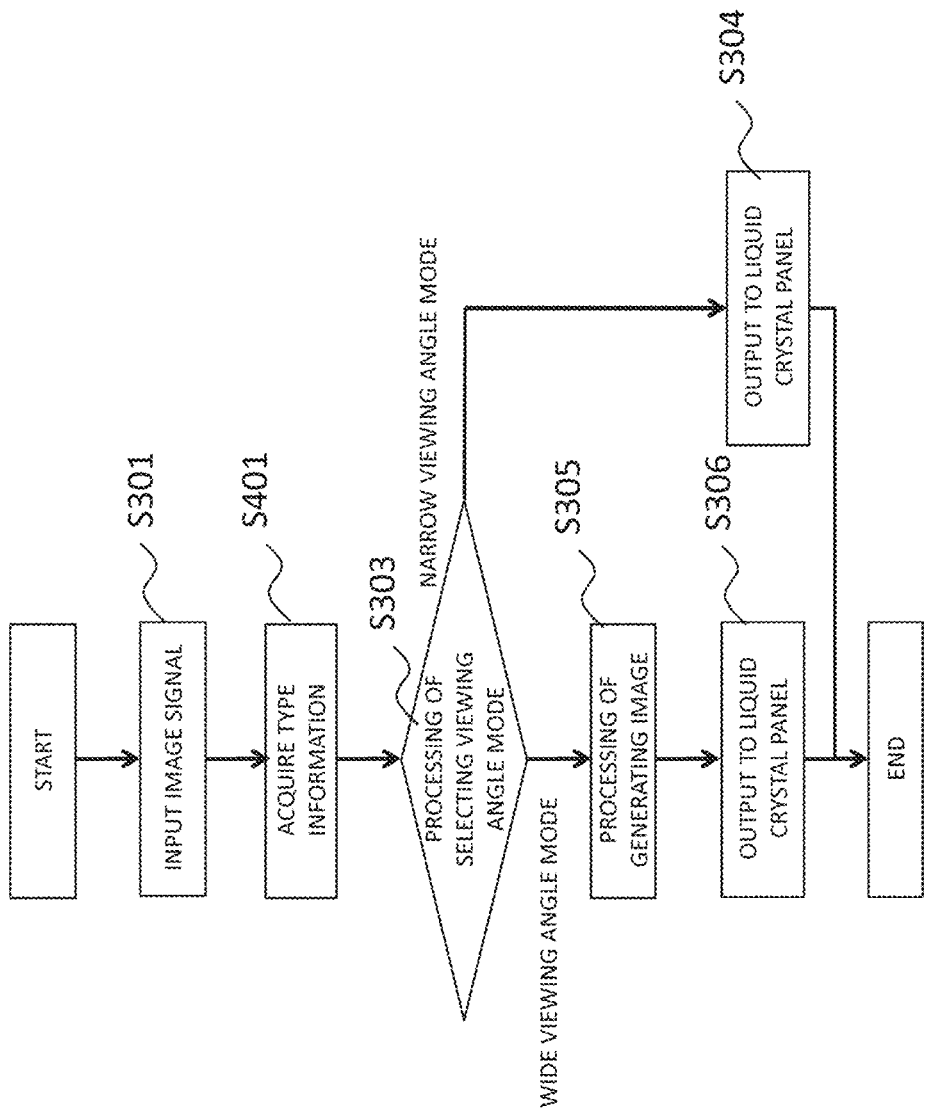
FIG. 10 is a flowchart showing processing in Embodiment 2.

In Embodiment 2, it is assumed that first image data includes additional information showing the content of an image (whether the wide viewing angle mode is to be applied to the image or the narrow viewing angle mode is to be applied to the image). In this case, determination on the type of the image through an image analysis as in Embodiment 1 does not need to be performed. In Embodiment 2, as shown in FIG. 10, the image processing unit 202 performs processing of acquiring additional information showing the content (type) of an image from the first image data in step S401, instead of step S302 in FIG. 3. In the subsequent step S303, the image processing unit 202 performs processing of selecting the wide viewing angle mode or the narrow viewing angle mode as the display mode, based on the additional information acquired from the first image data. With a configuration that allows various additional information to be transmitted together with an image signal, e.g., an HDMI® interface, the display mode can be determined using the additional information. A method of generating an image to be displayed in the second liquid crystal panel 111 is similar to that in Embodiment 1.

Embodiment 3

A display device of Embodiment 3 will be described.

Figure 11:
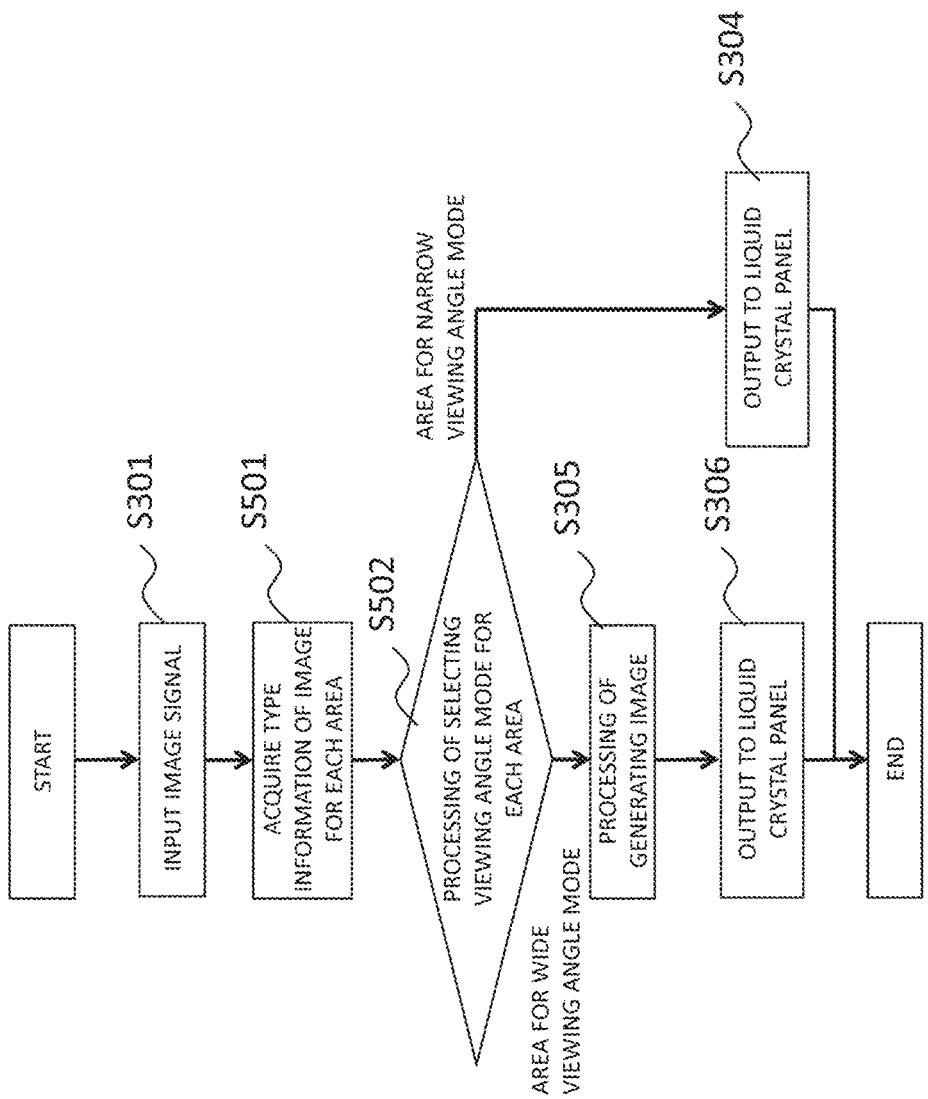
FIG. 11 is a flowchart showing processing in Embodiment 3.

Embodiment 3 assumes a case where the content (type) of an image is determined in advance for each area in the image. In this case, as shown in FIG. 11, the image processing unit 202 acquires information on the content of an associated image for each area in the image, in step S501 following step S301. In the subsequent step S502, the image processing unit 202 selects the narrow viewing angle mode or the wide viewing angle mode in accordance with the content of the image for each area. The display mode may be determined in advance for each area in the image. In this case, the image processing unit 202 acquires information on the associated display mode for each area in the image to perform selecting the narrow viewing angle mode or the wide viewing angle mode based on the acquired display mode.

Figure 12:
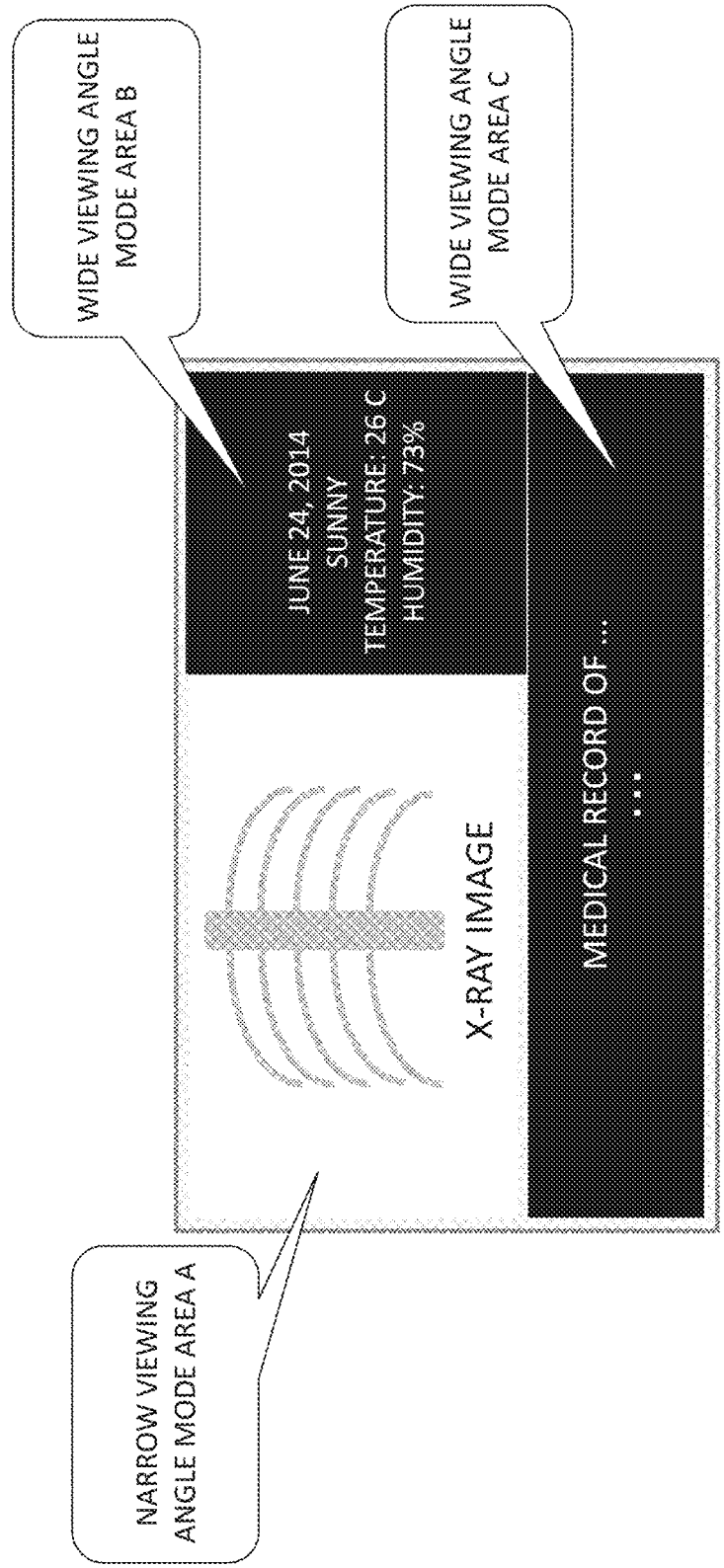
FIG. 12 is a display example of a viewer for medical use in Embodiment 3.

A viewer for a medical image as shown in FIG. 12 is an example in which the type of a display image is determined for each area in a screen. Within the screen of the viewer for a medical image of FIG. 12 are area A to display an X-ray image of a patient and areas B and C to display an image (which is not a natural image) forming a graphical user interface (GUI), such as a string of characters showing diagnostic information or a menu bar. The narrow viewing angle mode is associated with area A, and the wide viewing angle mode is associated with areas B and C. Such information on the area in the screen and information on the type of image associated with each area (or information on the display mode) may be acquired as information transmitted together with an image signal in a similar manner to Embodiment 2 or may be acquired with other methods. An example is to determine area information and image type information through an image analysis in a similar manner to Embodiment 1, store the determination result in a storage device (not shown), and select the display mode for each area based on the stored area information and image type information while an image signal with the same layout is being input.

Embodiment 4

A display device of Embodiment 4 will be described.

Figure 13:
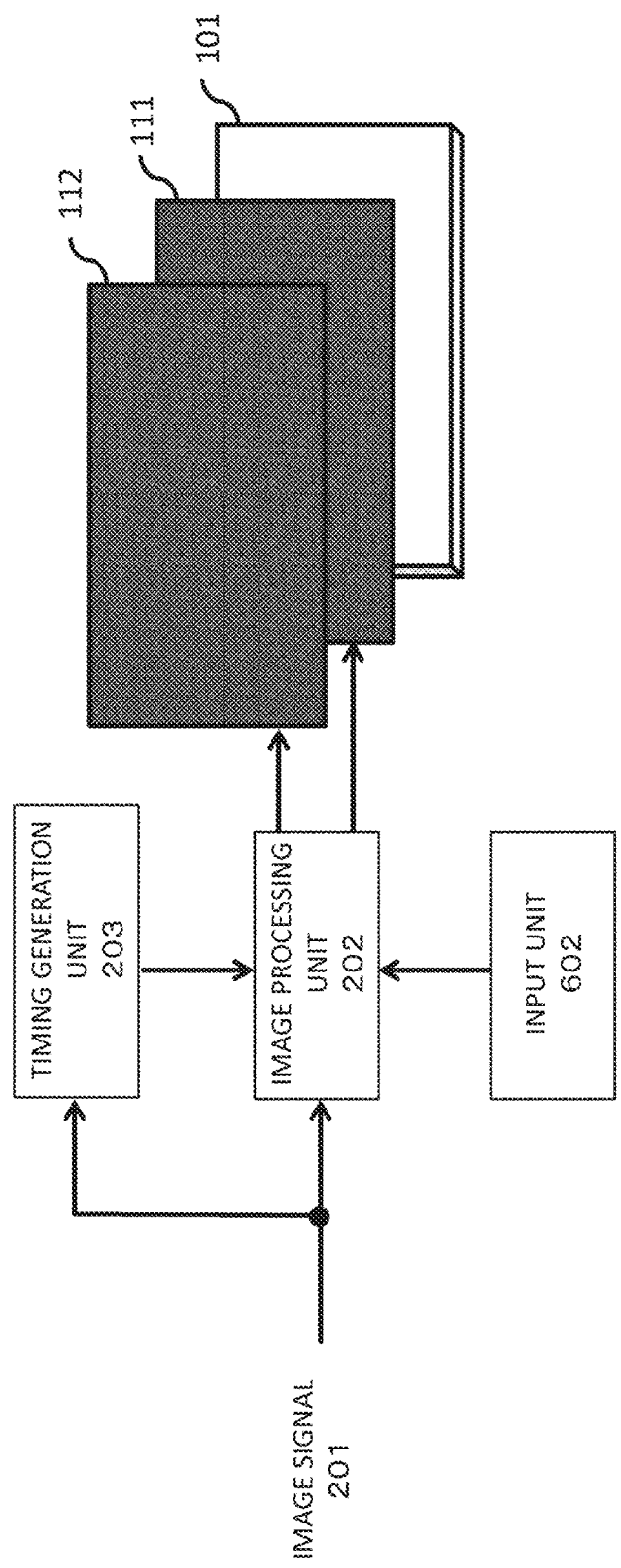
FIG. 13 is a block diagram showing an example of the configuration of a display device in Embodiment 4.

FIG. 13 is a block diagram showing the configuration of the display device in Embodiment 4. Unlike in FIG. 1, an input unit 602 to which a user can input an instruction is provided. With the input unit 602 of the display device in Embodiment 4, an instruction to select (designate) a display mode desired by a user can be input to the display device. The image processing unit 202 performs control of selecting the display mode designated by a user. For example, in the case where displaying in a display mode automatically selected and applied through control in Embodiment 1 has not been satisfactory to an observer, the observer can manually display an image in a display mode of preference.

The input unit 602 may further allow input of an instruction by a user to designate the intensity of image processing (level of the wide viewing angle mode) upon generating second image data to be displayed in the second liquid crystal panel 111 in the wide viewing angle mode. The level of the wide viewing angle mode may be settable in a plurality of stages, e.g., "high," "medium," "low," and "off" (narrow viewing angle mode), or may be subject to a stepless adjustment through a continuous value. In Embodiment 4, the level can be set according to the preference of a user. The image processing unit 202 generates an image to be displayed in the second liquid crystal panel 111 based on the level set by a user.

The input unit 602 accepts an input of instruction from a user to set the level of a viewing angle mode through, for example, a GUI displayed in the display device and an input device such as a keyboard or mouse. The input unit 602 may accept an input of instruction from a user through a button provided to the body of the display device, a remote controller, or the like. The configuration of the input unit 602 is not limited to the above.

As a situation in which a user is not satisfied with the automatically-selected display mode, a case of displaying a posterized image or an image of animation is conceivable, for example. With such an image, it is presumed that an observer expects displaying at high contrast (in the narrow viewing angle mode). However, in the case of automatic determination, there is a possibility that the wide viewing angle mode is selected due to the absence of a natural image, depending on the setting of a determination method. In such a case, in Embodiment 4, a user can manually set the display mode to the narrow viewing angle mode. Therefore, a user can observe an image being displayed according to the preference.

Figure 14B:
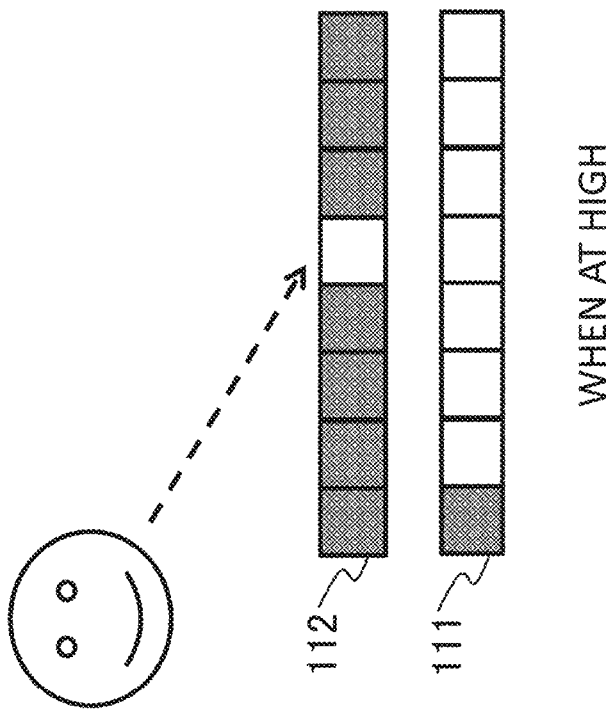
FIGS. 14A and 14B are representations showing the relationship between display mode setting and image generation in Embodiment 4.
Figure 14A:
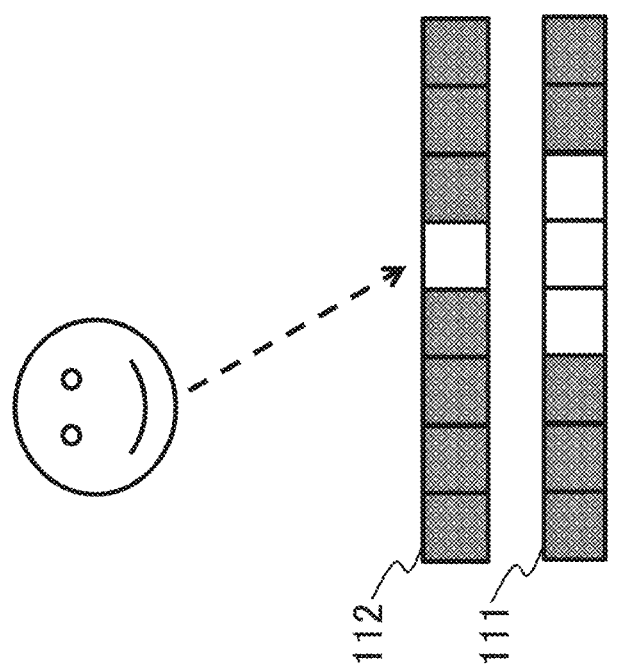

The image processing unit 202 reduces the size to which an area corresponding to a pixel in an original image is enlarged as in FIG. 14A, in the case where the level set by a user is "low," and increases the size to which an area corresponding to a pixel in an original image is enlarged as in FIG. 14B, in the case where the level is "high." In the case where an image generated at "high" level is displayed in the second liquid crystal panel 111, a double image can be prevented, even in the case where the angle of observation for a screen is large as shown in FIG. 14B. In the case where an image generated at "low" level is displayed in the second liquid crystal panel 111, a double image can be prevented in the case where the angle of observation is small as shown in FIG. 14A, and a decrease in display contrast can be prevented.

With Embodiment 4, displaying according to the preference of a user is possible, since the user can manually set the display mode even in the case where the wide viewing angle mode has been selected by automatic determination with respect to an image for which displaying in the narrow viewing angle mode is desirable for the user.

Embodiment 5

A display device of Embodiment 5 will be described. In Embodiment 5, a configuration will be described in which the display mode is selected in accordance with the observation distance of a user and the size of a screen of the display device (horizontal dimension of a display area of a liquid crystal panel).

Figure 15:
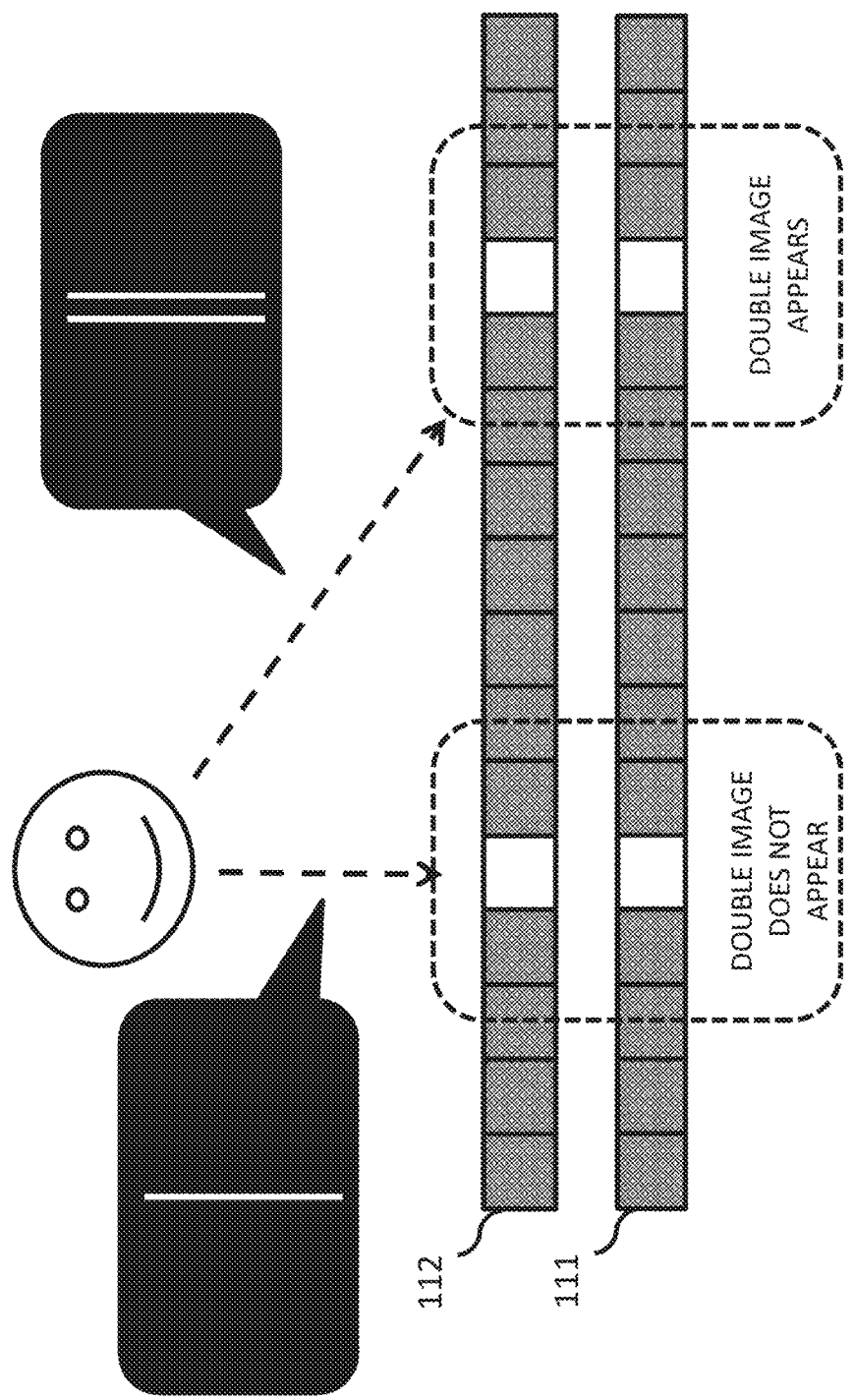
FIG. 15 is a representation illustrating a case where a double image appears at an end part of a display device with a large screen size.

For example, in the case of a small liquid crystal display with a screen size of approximately 7 inches or less, the small screen allows a user to observe the screen approximately from the front regardless of the observation distance upon the user observing the end of the screen, and a double image is less likely to appear even at the end of the screen. However, in the case of a large liquid crystal display with a screen size of approximately 60 inches or greater, a user is made to substantially observe the screen obliquely, particularly when the observation distance is close upon the user observing the end of the screen. Therefore, in the case of observing a large display from a close distance, a double image is more likely to appear at the end of a screen compared to the middle of the screen, as in FIG. 15.

Figure 16:
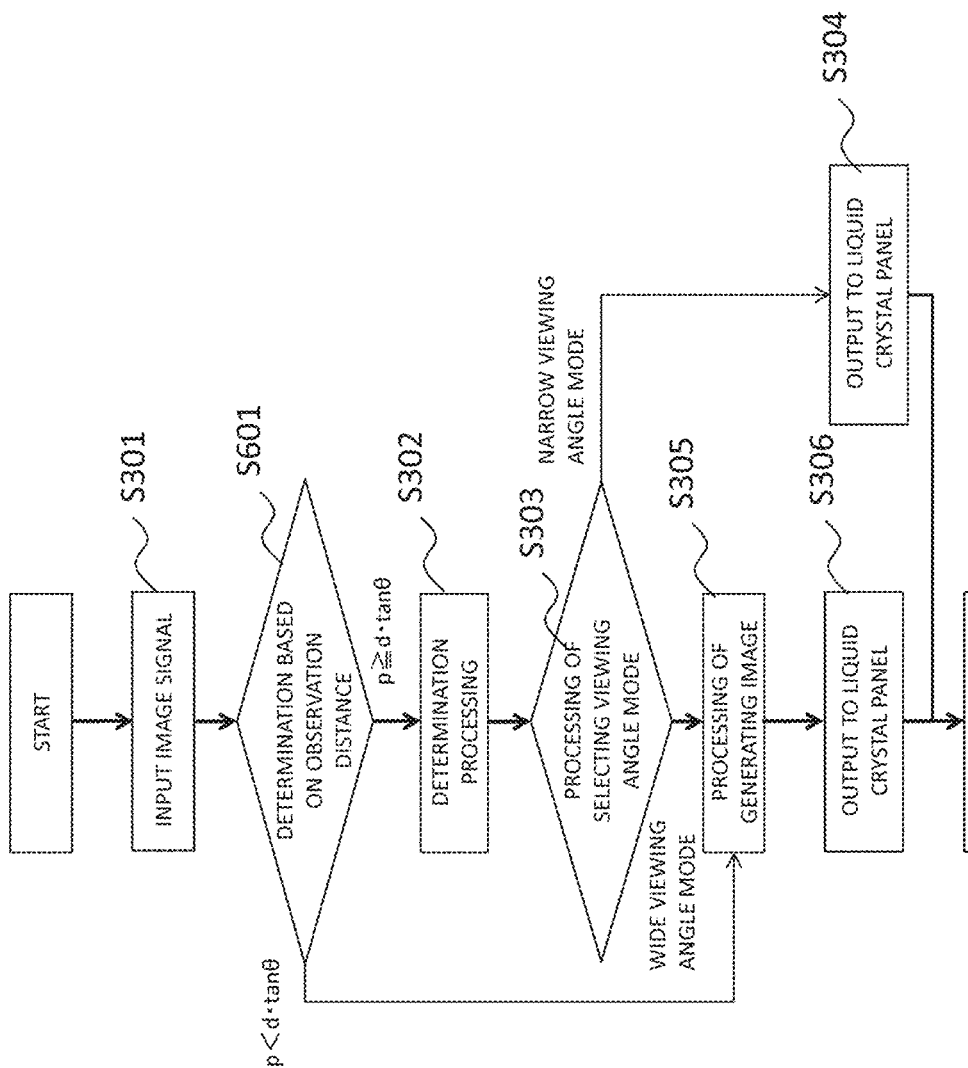
FIG. 16 is a flowchart showing processing in Embodiment 5.

Thus, the display device of Embodiment 5 includes the input unit 602 that allows a user to input an instruction to the display device in a similar manner to Embodiment 4, so that an input of information on the observation distance from a user is accepted, and display processing is selected in accordance with the observation distance and the screen size. FIG. 16 is a flowchart representing processing of the display device in Embodiment 5. In FIG. 16, processing in steps denoted by the same reference signs as in the flowchart already described is the same in content as what has already been described. Therefore, detailed descriptions will be omitted herein. In step S601 of FIG. 16, the image processing unit 202 accepts an input of information on the observation distance from a user and determines whether or not to perform displaying in the wide viewing angle mode based on the relationship between the input observation distance and the size of the screen (display area) set in advance.

Specifically, applying the idea described with expression 3, the image processing unit 202 determines whether an input observation distance R and a width W of the screen set in advance satisfy the following expression.

[Formula 5]

$$\tan\theta = \frac{W/2}{R} \quad \text{(Expression 5)}$$
$$p \geq d\tan\theta$$

In the case where the observation distance and the screen size satisfy the condition of expression 5, it can be said that a double image is less likely to appear even at the screen end. Therefore, the image processing unit 202 determines that the wide viewing angle mode is unnecessary. Then, in a similar manner to Embodiment 1, it proceeds to determination processing of step S302.

In the case where the observation distance and the screen size do not satisfy the condition of expression 5, the image processing unit 202 brings the display mode to the wide viewing angle mode and proceeds to step S305 to perform processing of generating an image of low resolution for displaying in the second liquid crystal panel 111. The processing of generating the image is performed based on expression 4. The angle of observation is θ in the case where a user located in the front of the display device observes the endmost part of the screen. For example, in the case where a user located in the front of a 60-inch screen (with an aspect ratio of 16:9) at a distance of 1500 mm observes the end part of the screen, the angle of observation θ is approximately 23.2 degrees, and d·tan θ is 0.86 when the distance d between the liquid crystal panels is 2 mm. When the pixel pitch p of an LCD is 0.3 mm, the number of pixels x for enlargement is 3 from expression 4.

In step S601, information on not only the observation distance but also the screen size (size of display area) may be input from a user.

With Embodiment 5 described above, a double image can be prevented from appearing at an end part of a screen even when the screen is large, since the display mode is selected based on the relationship between the observation distance of a user and the size of the screen. While an example in which a user inputs information on the observation distance to the display device has been shown in Embodiment 5, a method with which the display device acquires the observation distance of a user is not limited as such. For example, it may be such that the display device includes a sensor to measure the distance of a user, and the observation distance is acquired based on the measured value of the sensor. It may also be such that the display device includes a camera, and the observation distance is acquired by analyzing image data obtained through capturing an image of a user.

Some embodiments of the present invention have been specifically described above. However, the present invention is not limited to the embodiments, and various modifications and changes are possible without departing from the gist of the invention. For example, in the respective embodiments above, an example has been described in which the configuration of superimposing the first liquid crystal panel 112, the second liquid crystal panel 111, and the backlight 101 in that order from the display surface side is applied to the display device. The present invention can also be applied to a display device with a configuration in which a liquid crystal panel and an organic electro-luminescence (EL) panel are superimposed, such that light emitted from the organic EL panel is modulated with the liquid crystal panel to display an image with transmitted light of the liquid crystal panel. In this case, the first liquid crystal panel 112 is the first display unit, and the organic EL panel is the second display unit. Same images are displayed in the liquid crystal panel and the organic EL panel in the narrow viewing angle mode, and a low-resolution image is displayed in the organic EL panel in the wide viewing angle mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148690, filed on Jul. 28, 2015, which is hereby incorporated by reference herein in its entirety.

What is claimed is:

1. A display device comprising:
a first display unit;
a second display unit arranged on a back side of the first display unit;
at least one processor; and
at least one memory storing at least one program which, when executed by the at least one processor, causes the display device to:
acquire first image data;
select automatically a display mode based on contents of the first image data;
control the first display unit to transmit light from the second display unit based on the first image data;
generate second image data corresponding to the first image data based on the selected display mode; and
control the second display unit so as to display an image based on the second image data, wherein
in a case where a first display mode is selected, the image displayed based on the second image data is blurred more than in a case where a second display mode is selected.

2. The display device according to claim 1, wherein the second image data is image data to be displayed on the second display unit in order to prevent a double image caused by pixels in same positions on the first display unit and on the second display unit being visually recognized as being in differing positions due to parallax.

3. The display device according to claim 1, wherein the first display mode is selected in a case where a change in brightness within an image of the first image data is greater than a threshold value, and the second display mode is selected in a case where the change in brightness within the image of the first image data is less than or equal to the threshold value.

4. The display device according to claim 1, wherein the first display mode is selected in a case where an image of the first image data is formed of a text or a graphic pattern, and the second display mode is selected in a case where the image of the first image data is a natural image.

5. The display device according to claim 1, wherein the content of the image of the first image data is determined through image analysis.

6. The display device according to claim 1,
wherein in a case where the first image data includes additional information indicating the content of the image of the first image data, the determination of the content of the image of the first image data is performed based on the additional information.

7. The display device according to claim 1,
wherein content for each area in an image of the first image data is specified in advance, and
the selection of a display mode is performed based on the content specified for each area in the image of the first image data.

8. The display device according to claim 1,
wherein a display mode for each area in an image of the first image data is specified, and
the selection of a display mode is performed based on the display mode specified for each area in the image of the first image data.

9. The display device according to claim 1, wherein the first display unit is a liquid crystal panel, and
a transmittance of the first display unit is controlled based on the first image data.

10. The display device according to claim 1, wherein the second display unit is formed of a backlight and a liquid crystal panel that modulates light from the backlight.

11. The display device according to claim 1, wherein the second display unit is an organic EL panel.

12. A method of controlling a display device including a first display unit and a second display unit arranged on a back side of the first display unit,
the method comprising the steps of:
acquiring a first image data;
selecting automatically a display mode based on contents of the first image data;
controlling the first display unit to transmit light from the second display unit based on the first image data;
generating second image data corresponding to the first image data based on the selected display mode; and
controlling the second display unit so as to display an image based on the second image data, wherein in a case where a first display mode is selected, the image displayed based on the second image data is blurred more than in a case where a second display mode is selected.

13. A non-transitory computer readable medium storing a program to cause a computer to execute each step of a method of controlling a display device including a first display unit and a second display unit arranged on a back side of the first display unit,
the method including the steps of:
acquiring a first image data;
selecting automatically a display mode based on contents of the first image data;
controlling the first display unit to transmit light from the second display unit based on the first image data;

generating second image data corresponding to the first image data based on the selected display mode; and controlling the second display unit so as to display an image based on the second image data, wherein in a case where a first display mode is selected, the image displayed based on the second image data is blurred more than in a case where a second display mode is selected.

* * * * *